UNITED STATES PATENT OFFICE.

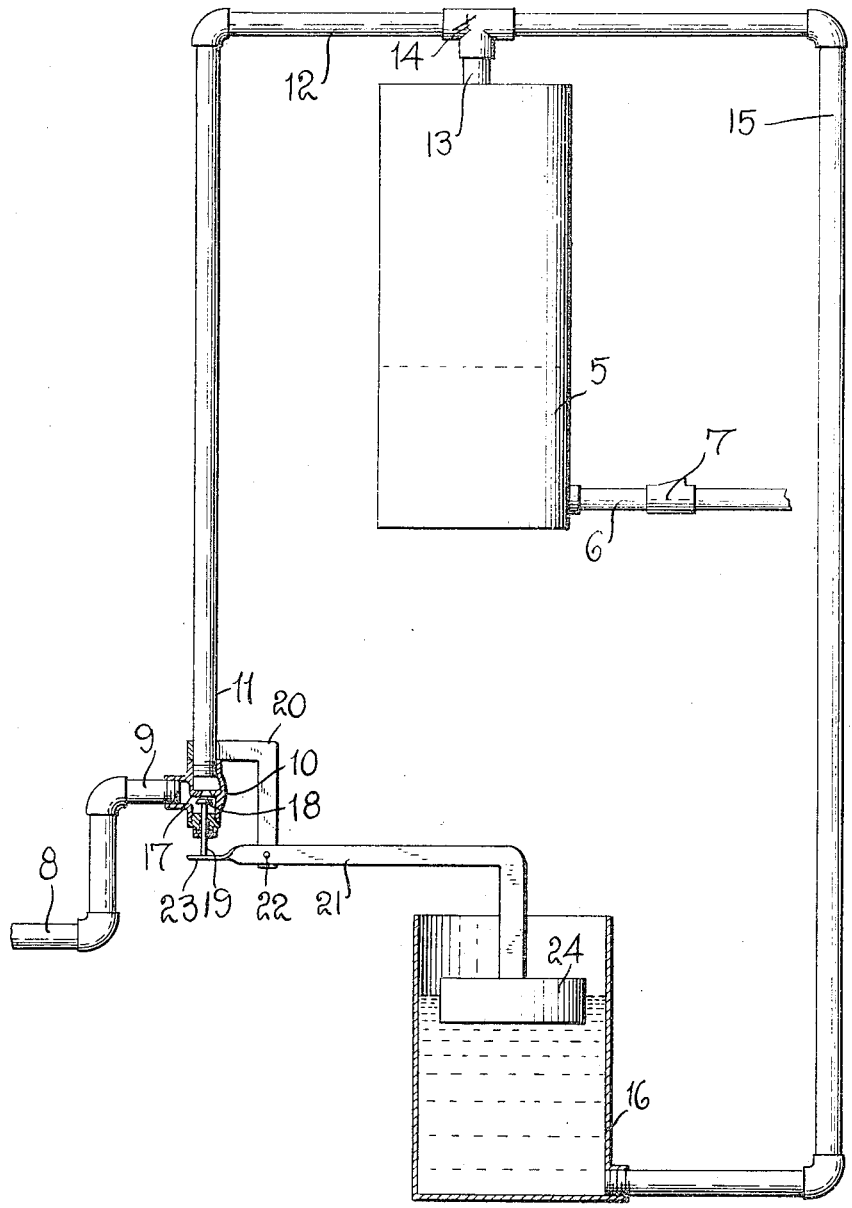

JAMES W. HOBBS, OF BURKBURNETT, TEXAS.

VACUUM-REGULATOR FOR OIL-PUMPS.

1,259,235.	Specification of Letters Patent.	Patented Mar. 12, 1918.

Application filed October 18, 1916. Serial No. 126,390.

*To all whom it may concern:*

Be it known that I, JAMES W. HOBBS, a citizen of the United States, residing at Burkburnett, in the county of Wichita and State of Texas, have invented certain new and useful Improvements in Vacuum-Regulators for Oil-Pumps, of which the following is a specification, reference being had to the accompanying drawings.

This invention relates to an improved vacuum regulator or cut-off for oil pumps and has for its primary object to provide a simple and effective device whereby the body of oil in the gas separating tank may be maintained at a predetermined level and possibility of the vacuum pulling the oil over the top of the tank obviated.

It is another object of the invention to provide a very simply constructed and operated automatic cut-off valve in the vacuum of the pipe line to the pump.

It is a further general object of my invention to improve and simplify devices employed for the above purpose, render the same positive and reliable in operation, and capable of manufacture at relatively small cost.

In the accompanying drawing, I have illustrated a sectional diagrammatic view showing my improved controlling or regulating device as arranged in the vacuum pipe line.

Referring in detail to said drawing, 5 designates a suitably constructed tank into which the oil is being pumped from the well. An overflow or outlet pipe 6 is connected to the bottom of said tank having a check valve 7 arranged therein.

8 designates the pipe line extending from the vacuum pump (not shown), said pipe line having an elbow or offset 9 therein which is connected by means of the L-shaped coupling 10 to the lower end of a vertical pipe 11. A pipe 12 connects the upper end of the pipe 11 to a nipple 13 centrally projecting into the top of the tank 5, by means of the T-shaped coupling 14. A pipe 15 is also connected to said coupling and to the lower end of a water reservoir 16.

The coupling 10 has a horizontal, internal valve seat 17 to receive a valve 18 fixed upon the upper end of a stem 19. A suitable bracket or support 20 is fixed to the pipe 11 and, upon the same, an angular lever 21 is pivoted adjacent one of its ends, as at 22. This end of the lever is extended beyond the pivot and its extremity disposed in a horizontal plane to engage and support the valve stem 19, as indicated at 23. The other end portion of the lever 21 is angularly extended downwardly into the upper end of the reservoir 16 and a float 24 is fixed thereto.

In the operation of the apparatus, the reservoir 16 is filled with water so as to raise the float 24 and permit the valve 18 to remain in open position. The oil is supplied to the tank 5 by the pumps at the wells (not shown). The vacuum is created in the operation of the pump through the pipes 8, 11, 12, 13 and 15, and this vacuum holds the oil in the gas separating tank 5 at a certain predetermined level. The vacuum is regulated so that it is never sufficiently great to pull the oil into the vacuum pipe lines. Thus, when the oil reaches this predetermined level, the weight of the oil in the tank 5 is greater than can be lifted by the vacuum so that the oil will flow by gravity through the overflow pipe 6 while the vacuum takes off the gas collecting in the upper portion of the tank 5. When the oil gets above this level, the vacuum through the pipe 15 withdraws the water from the reservoir 16 so that the float 24 gradually lowers therein and the end 23 of the lever 21 raises the valve 18 against the seat 17, thus cutting off the vacuum from the pump so that the excess oil in the tank 5 will pass out through the overflow pipe 6 into a suitable storage tank. In this manner, it will be seen that the vacuum is automatically regulated or controlled so that the oil in the tank 5 can never rise to any great extent above a predetermined level or be drawn through the top of the tank by the vacuum.

From the foregoing description, taken in connection with the accompanying drawing, the construction, manner of operation and several advantages of the invention will be clearly and fully understood. The device, while exceedingly simple, has been found to be very reliable and positive in its action. It is, of course, manifest that various other relative arrangements of the tank 5 and reservoir 16, together with the pipe line connections, may be adopted. The several component parts of the device are also susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

1. The combination of an oil and gas separating tank, a vacuum pipe line connected to the top of the tank, an overflow pipe connected to the bottom of the tank, a float reservoir, a pivoted lever having a float on one end disposed in said reservoir, a valve in the vacuum pipe line, said valve being normally open, and a connection between the vacuum pipe line and the lower end of the reservoir whereby the liquid is withdrawn from the reservoir when the oil in the tank reaches a predetermined level to permit the float to lower and operatively engage the lever with the valve to close the same and cut off the vacuum.

2. The combination of an oil and gas separating tank, a vacuum pipe line connected to the top of the tank, an overflow pipe connected to the bottom of the tank, a float reservoir, a pivoted lever having a float on one end disposed in said reservoir, a valve in the vacuum pipe line, said valve being normally open, a lever pivotally mounted adjacent one of its ends, the other end of said lever being angularly extended and provided with a float disposed in said reservoir, said lever at its pivoted end supporting the valve in open position, and a pipe connection between the vacuum pipe line and the lower end of the serervoir to withdraw the water from the reservoir when the oil in the tank reaches a predetermined level, whereby the operation of the lever is permitted to move the valve to its closed position and cut off the vacuum.

In testimony whereof I hereunto affix my signature in the presence of two witnesses.

J. W. HOBBS.

Witnesses:
T. A. KIC,
W. C. FRENCH.

Copies of this patent may be obtained for five cents each, by addressing the "Commissioner of Patents, Washington, D. C."